Feb. 13, 1934.  H. B. BENSON  1,946,892
BRAKE MECHANISM
Filed May 5, 1933

INVENTOR.
Harold B. Benson
BY
ATTORNEY.

Patented Feb. 13, 1934

1,946,892

UNITED STATES PATENT OFFICE 1,946,892

BRAKE MECHANISM

Harold B. Benson, Brooklyn, N. Y.

Application May 5, 1933. Serial No. 669,494

1 Claim. (Cl. 188—77)

This invention relates to brake mechanism for motor vehicles and while adapted for general application in this art is particularly intended for use on trucks which, because of their great weight, are extremely difficult to stop with existing brake mechanisms.

According to present practice, the use of manually operated brake mechanisms for trucks has been largely superseded by pneumatic and hydraulic brake mechanisms in order to obtain sufficient power to brake the vehicle without requiring great physical exertion on the part of the driver. However, mechanisms of this type involve considerable expense for installation and require almost constant servicing and maintenance with consequent undesirable costs. The purely mechanical brake is by far the preferable, but in the past has been open to the objection that it unduly fatigues the driver, because of the great energy which he must expend in braking the vehicle with those mechanical devices heretofore employed for this purpose.

With the foregoing considerations in mind, the object of the present invention is to provide a purely mechanical brake mechanism which will permit of the application of tremendous braking force through a minimum of effort on the part of the driver. This is accomplished in accordance with the present invention through a link and lever connection between the brake rod and the ends of the brake band to greatly multiply the force applied by the driver in this application to the brake band.

Speaking generally, the invention consists of a lever, one end of which is secured to one end of the brake band and the other end of which is secured to the brake rod. This lever is in turn fulcrumed upon links pivotally associated with the other end of the brake band with the fulcrum relatively close to the pivotal connection between said lever and the corresponding end of the brake band. The lever is thus in effect a lever of the first class with a relatively long power arm and a relatively short work arm, and through this relation of the parts, power applied by the driver is greatly multiplied in its application to the brake drum.

An important factor of this invention resides in the fact that the lever and the links referred to are carried wholly by the brake band and consequently the action of the lever to pull one end of the brake band against the brake drum reacts through the fulcrum lengths to correspondingly pull the other end of the brake band against the brake drum, whereby the force applied to the two ends of the brake drum is balanced. Consequently the wear on the brake is uniform and the brake band is caused to properly conform throughout.

A very important further feature of the present invention consists in the elimination of the spacer spring generally employed in mechanical brakes. These springs have been intended to space the ends of the brake band apart in order to preclude drag when the brake is off. These springs have never been dependable, they quickly lose their resiliency, become caked with mud, etc., and in a very short time permit the brake band to ride on the drum and wear or burn out. The present invention entirely eliminates this undesirable feature found in practically all prior constructions.

Features of the invention, other than those specified, will be apparent from the hereinafter detailed description and claim, when read in conjunction with the accompanying drawing.

The accompanying drawing illustrates one practical embodiment of the invention, but the construction therein shown is to be understood as illustrative, only, and not as defining the limits of the invention.

Figure 1:
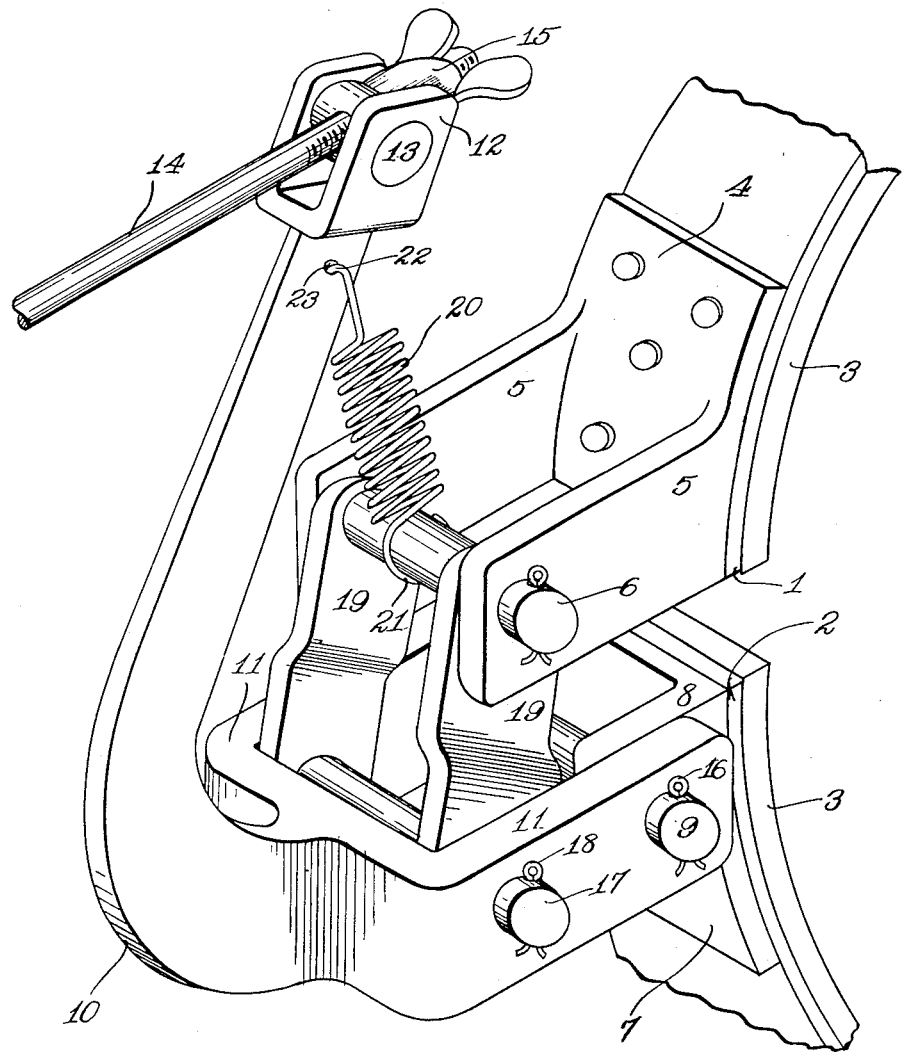
Figure 1 is a perspective view showing brake mechanism embodying the present invention.
Figure 2:
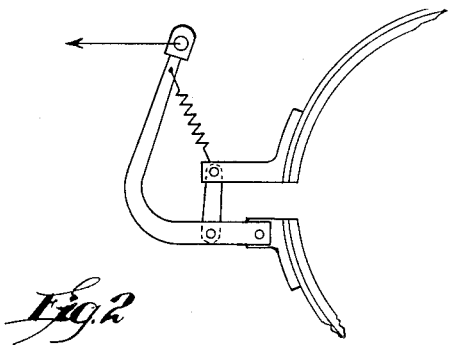
Figure 2 is a side elevation showing the structure in a more or less diagrammatic manner.

Referring to the drawing, 1 and 2 designate adjacent ends of a conventional brake band having an appropriate lining 3 and adapted to cooperate with the usual brake drum. All of these parts are conventional and form no part of the present invention. Attached to the end 1 of the brake band is a fixture 4 provided with spaced apart lugs 5 carrying a pin 6. Attached to the end 2 of the brake band is a fixture 7 having spaced apart lugs 8 carrying a pin 9. The fixtures 4 and 7 are preferably riveted to the brake band in the usual manner.

In accordance with the present invention, there is provided a lever 10, one end of which is forked to form two legs 11, the unforked portion of the lever being bent or curved upwardly and provided with a bifurcated end 12 carrying a pivot pin 13. This pivot pin 13 is perforated so that the brake rod 14 may be passed therethrough and a wing nut 15 threads upon the brake rod for the purpose of making desirable adjustments as hereinafter described. The legs 11 of the forked end of lever 10 straddle lugs 8 and are perforated so that the pin 9 may extend through said legs and receive a cotter pin 16 to hold the parts in assembled relation.

Spaced from the perforations for the pin 9 in the legs 11, other perforations are provided in said legs for a pin 17 held in place by cotter pins 18. The pin 17 is parallel to the pin 9 and is also parallel to the pin 6 which is supported by the lugs 5. Links 19 which may be offset as shown are perforated at their opposite ends to receive the pins 6 and 17, and a spring 20 is provided at one end with a hook end 21 to engage the pin 6 and at the other end with a hook 22 to engage with the perforations 23 in the lever 10 near the bifurcated end 12. The hook 22 may, however, engage directly with the bifurcated end or with the rod without departing from this invention. If desired, sleeves may be provided on the pins 6, 9 and 17 between the respective lugs and links to act as spacers.

When the structure is assembled in the manner stated and as shown in Figure 1, the spring 20 being under tension serves to elevate the pin 6 and depress the pin 17 for the purpose of expanding the brake band to free it from engagement with the brake drum. The rod 14 is of course supported in the usual manner and consequently it is possible through this arrangement and through proper adjustment of the wing nut 15 to regulate this opening movement in order that the brake band will not ride upon the drum. The normal condition of the parts is as shown in the drawing. However, when it is desired to brake the vehicle, the brake rod 14 is drawn forwardly through the employment of the conventional brake mechanism operated either by foot power or by a hand lever, or by both as may be desired.

As the rod 14 moves forwardly, it carries with it the bifurcated end 12 of the lever 10. This lever 10 employs as its fulcrum during this operation the pin 17 which is suspended on the links 19 and as a result the lever pivots on this pin to raise the pin 9 and draw the lining on the lower end 2 of the brake drum into engagement with the brake drum. This action, however, is accompanied by a reaction for, as force is applied to the pin 9, weight is applied to the fulcrum and this weight is transmitted through the links 19 to the pin 6 with the result that the upper half of the brake band is lowered to bring this lining 3 into engagement with the brake drum. As greater pressure is applied to the lower half of the brake band in the manner described, a reaction results in similar pressure to the upper half of the brake drum and consequently there is a substantial balancing of pressures which causes uniform braking with uniform conformation of the brake lining to the drum.

With this structure, the brake band has practically a floating connection and is permitted to come into proper conformity with the drum through the link and lever connection described. As soon as the braking tension on the rod 14 is relieved, the spring 20 causes the parts to reassume their loosened or non-braking relation.

I wish to lay particular stress upon the use of a fulcrum suspended on links from the upper half of the brake band for the purpose of supporting the lever acting upon the lower half of the brake band. This is the fundamental operation of the present invention. By making the arm 10 relatively long and curving it outwardly and upwardly as shown, I am able to obtain a multiplication of power and at the same time assemble the parts in a compact and efficient manner.

An important practical advantage of the present invention is that my brake mechanism can be installed upon trucks in a few minutes in lieu of those now employed and at a minimum cost. It requires no maintenance costs and experience has shown that it will stop a truck quicker and with less effort on the part of the driver than any mechanical brake on the market—furthermore, it equalizes the wear on the brake band, so that maximum life is obtained therefrom.

The foregoing detailed description sets forth the invention in its preferred practical form, but the invention is to be understood as fully commensurate with the appended claim.

Having thus fully described the invention, what I claim as new and desire to secure by Letters Patent is:

In a brake mechanism intended primarily for a truck jack shaft, a brake rod and a split brake band having upper and lower lugs carried by the respective ends of the brake band and projecting rigidly outwardly in substantially parallel relation beyond the circumference of the brake band with the upper lug longer than the lower lug, in combination with a pivot pin carried by the upper lug, links pivoted on and depending from said pin, a fulcrum pin supported by the lower end of said links, said links being free and unrestricted between the pins, a lever having a forked end straddling said links and perforated to receive the opposite ends of the fulcrum pin, a pin extending through the lower lug and through the forked end of the lever to pivotally attach said forked end of the lever to the lower portion of the brake band, and said lever having a relatively long power arm projecting in a direction substantially perpendicular to the forked end thereof and pivotally connected to the brake rod, and a tension spring stretched between the power arm of the lever and the upper lug to normally hold the brake band in non-breaking position.

HAROLD B. BENSON.